United States Patent [19]
Tock et al.

[11] Patent Number: 6,115,802
[45] Date of Patent: Sep. 5, 2000

[54] EFFICIENT HASH TABLE FOR USE IN MULTI-THREADED ENVIRONMENTS

[75] Inventors: Theron D. Tock, Sunnyvale; Thomas K. Wong, Pleasanton, both of Calif.

[73] Assignee: Sun Mircrosystems, Inc., Palo Alto, Calif.

[21] Appl. No.: 09/034,181

[22] Filed: Mar. 3, 1998

Related U.S. Application Data

[63] Continuation of application No. 08/543,215, Oct. 13, 1995, abandoned.

[51] Int. Cl.$^7$ .................................................. G06F 12/00
[52] U.S. Cl. ............................. 711/216; 707/1; 707/200
[58] Field of Search ................................. 711/147, 141, 711/145, 216; 707/1, 200, 201

[56] References Cited

U.S. PATENT DOCUMENTS

| | | | |
|---|---|---|---|
| 4,996,663 | 2/1991 | Nemes | 364/900 |
| 5,109,511 | 4/1992 | Nitta et al. | 395/650 |
| 5,121,495 | 6/1992 | Nemes | 395/600 |
| 5,287,499 | 2/1994 | Nemes | 395/600 |
| 5,339,398 | 8/1994 | Shah et al. | 395/400 |
| 5,495,609 | 2/1996 | Scott | 395/600 |

*Primary Examiner*—Eddie P. Chan
*Assistant Examiner*—Kevin Verbrugge
*Attorney, Agent, or Firm*—Holland & Hart LLP

[57] ABSTRACT

A lockless-lookup hash table for use in a multi-threaded processing system has a memory whose storage locations hold elements. Each memory location is uniquely identified by an index value, and each element includes a key and a value. The target location for storing an input value is determined by generating a hash value from an input key value, and probing storage locations, beginning at the one designated by the generated hash value, until an empty location is found. In accordance with one aspect of the invention, the hash table may be used as a commonly accessed resource in a multi-threaded environment without requiring locks associated with lookup operations. In such environments, incorrect results may be tolerated, so long as the lookup operation is guaranteed never to return a value that had never been stored into the table by one of the threads in the system. This characteristic is provided in the present invention by an insert operation that never writes the value portion of the element into a location last. Instead, the last thing stored by an insert operation is the key, or alternatively any other portion of the element that is utilized by the lookup operation for determining whether a sought-after element has been located. Other aspects of the invention relate to optimizing performance of the hash table during lookup and delete operations, and to reducing the number of erroneous results produced when lockless-lookup operations proceed in a multi-threaded environment.

45 Claims, 9 Drawing Sheets

| INDEX | T1 | T2 | T3 | T4 | T5 | T6 |
|---|---|---|---|---|---|---|
| 1 | | | | | | |
| 2 | | | | | | |
| 3 | | | | | | |
| 4 | | | | | | |
| 5 | KEY=A | KEY=A | KEY=A | KEY=A | KEY=A | KEY=A |
| 6 | KEY=B | DELETED | KEY=D | KEY=D | KEY=D | KEY=D |
| 7 | KEY=C | KEY=C | KEY=C | KEY=C | KEY=C | KEY=C |
| 8 | KEY=D | KEY=D | KEY=D | KEY=E | KEY=E | KEY=E |
| 9 | KEY=E | KEY=E | KEY=E | KEY=E | KEY=F | KEY=F |
| 10 | KEY=F | KEY=F | KEY=F | KEY=F | KEY=F | EMPTY |
| 11 | EMPTY | EMPTY | EMPTY | EMPTY | EMPTY | EMPTY |
| 12 | | | | | | |
| 13 | | | | | | |

TABLE CONTENTS

TIME →

*Fig. 1*

| INDEX | KEY | VALUE |
|---|---|---|
| 1 | | |
| 2 | | |
| 3 | | |
| 4 | | |
| 5 | A | 1 |
| 6 | D | 2 |
| 7 | C | 3 |
| 8 | D | 4 |
| 9 | E | 5 |
| 10 | F | 6 |
| 11 | EMPTY | |
| 12 | | |
| 13 | | |

*Fig. 2c*

| INDEX | KEY | VALUE |
|---|---|---|
| 1 | | |
| 2 | | |
| 3 | | |
| 4 | | |
| 5 | A | 1 |
| 6 | DELETED | 4 |
| 7 | C | 3 |
| 8 | D | 4 |
| 9 | E | 5 |
| 10 | F | 6 |
| 11 | EMPTY | |
| 12 | | |
| 13 | | |

*Fig. 2d*

EFFICIENT HASH TABLE FOR USE IN MULTI-THREADED ENVIRONMENTS

This application is a continuation of application Ser. No. 08/543,215, filed Oct. 13, 1995 now abandoned.

BACKGROUND

1. Field of Use

The present invention relates to tables and table search techniques and, more particularly, to an efficient organization of a hash table and corresponding techniques for accessing the hash table that are especially useful in multi-threaded environments.

2. State of the Related Art

In the computer sciences, various data structures, table organizations and access techniques have been studied in an effort to solve what may generally be referred to as the "searching problem." The term "searching problem" is used here to refer to the problem of locating a particular item of information that has been stored along with others in some fashion.

In the prior art, it has been recognized that the particular choice of an algorithm/data structure depends on the nature of the storage medium (internal memory, magnetic tape, disk, or other), on the nature of the data being organized, and on the requirements of the search (e.g., must the search be tailored to be fast on average, or is one concerned more with the worst case performance).

In general, the data may be stored into a table of "n" elements, where each element has a collection of fields associated with it. In the table, each field is associated with one of a number of attributes that, together, make up the element. One of the attributes is the "key" that refers to the element and on which the searching is based. Various techniques for organizing a table include lists, binary search trees, digital search trees and hash tables. The remainder of this disclosure will focus exclusively on hash tables.

A number of hash table techniques are well-known in the art. What these techniques have in common is that an element is stored in a table location that is computed directly from the key of the element. That is, the key is provided as an input to a hash function, h, which transforms the key into an index into the table. If the location of the table addressed by the index (represented here as T[index]) is empty, then the element may be stored there. If it is not empty, then a "collision" has occurred, and further techniques must be applied to find an empty location in which to store the element. It can be seen, then, that the properties of the hash table are determined, at least in part, by the hash function and the collision resolution method. Under certain circumstances, a hash table may be the best choice for organizing data, because the average times for a search can be made arbitrarily close to constant by allocating sufficient memory for the table.

Hashing techniques may be categorized as being either "open hashing" or "closed hashing." In principle, open hashing techniques permit the size of the table to grow indefinitely because the index generated by the hash function points to one of a number of classes, called "buckets", into which the element will be stored. Thus, each bucket comprises a list of elements. By constructing the list as a "linked list", those having ordinary skill in the art will recognize that the table size may be virtually unbounded.

In contrast to open hashing schemes, the number of entries that can be stored into a closed hash table cannot exceed a predefined number, which designates the size of the table. Because of this limitation, open hashing techniques may generally be preferred. However, several properties of the closed hash table make it advantageous under certain circumstances. One of these properties is the fact that one need not store, at each entry, a pointer to a next entry. Instead, conventional closed hashing techniques require that each element include only the key and value fields. Consequently where the size of the table is an important design consideration, a closed hash table may be preferred.

Furthermore, a closed hash table may provide better speed performance if the table is to be accessed by means of a hardware cache. Cache techniques are well-known. Very briefly, a computer architecture may include a slower, large main memory, and a faster, smaller hardware cache memory. In operation, the data used by a program is stored in the main memory. When the processor desires to retrieve a particular data item, it first looks for that item in the cache. If the data is not found (called a "cache miss"), then the data item is sought and retrieved from the main memory. In recognition of the fact that programs tend to read and write data that are stored at addresses that are close to one another in memory (referred to as the "locality principle"), whenever a cache miss occurs, the desired data item as well as a predefined number of "nearby" items (as determined by address) are retrieved from the main memory and loaded into the cache. As a result, the next attempt that the processor makes to retrieve a data item from the cache will likely result in success (referred to as a "cache hit"), obviating the need for the subsequent step of accessing main memory.

Because the collision resolution techniques employed in a closed hash table usually result in the data item being stored at a location that is at least close to the location designated by the index value, a processor is less likely to take multiple cache misses when attempting to access the table. Thus, where a hardware cache is employed, the closed hash table may be preferred over the open hash table, whose buckets may include elements that are widely distributed throughout the available address space.

It is known that a hash table can be shared by a number of concurrently operating threads of execution, which will henceforth be referred to throughout this specification as "threads." Such concurrent operation may result from each thread being assigned to a corresponding one of a number of processors in a multi-processor environment. Alternatively, logical concurrence may be achieved by an operating system using "time slice" techniques on only a single processor ("uni-processor").

When a hash table is to be shared by two or more threads, efficiency becomes a critical issue because it is often necessary to deny table access to all but one of the threads in the system if the table is to provide accurate insert, delete and lookup operations. For example, if Thread1 were permitted to store two characters, "AB" while Thread2 were concurrently storing the two characters "CD" to the same table location, one possible outcome would be that Thread1 would get as far as storing the first character "A," at which time Thread2 might store its two characters "CD." When Thread1 subsequently completes its operation by storing the final character "B," the resulting stored data, "CB", is a character string that was stored by neither thread.

Conventional solutions for ensuring that every thread has a consistent view of information in the shared hash table require severe forms of concurrency control which can detrimentally affect system performance due to excessive contention for access to the shared environment. For example, any of a number of well-known concurrency control locking strategies (henceforth referred to as "locks") may be applied to serialize the occurrence of table lookup, insert and delete operations. That is, one thread's access to the hash table is permitted, while all other threads are required to wait their turn. If the duration of the lockout is for any appreciable amount of time, a waiting thread in a time-sliced uni-processor system may be forced, by its operating system, to relinquish other system resources that it has acquired. Consequently, when that thread is subsequently granted access to the hash table, it may be forced to waste even more time reacquiring those resources which had been relinquished. In multi-processor systems, a thread that is waiting for a lock to become available may simply be left waiting, without any useful work being performed by the thread's processor. Consequently, reducing locking in this situation is very important for achieving good scalability.

One hash table operation that may be relatively time-consuming involves the deletion of a stored element from a closed hash table. This is because one cannot simply locate the element to be deleted and then mark it "empty" because doing so would disrupt the probe sequence for elements that collided with the one to be deleted. Therefore, it is further necessary, in some deletion algorithms, to have the additional capability of marking an element as "deleted." A location that has been marked as "deleted" acts like an empty location with respect to insertions, but like a full location with respect to searches.

However, marking a table location as "deleted" has a drawback in that search times will not improve after a deletion. That is, if the table becomes substantially full at some point, searches will never become more efficient no matter how many entries are deleted after that. One method of addressing this problem is by performing a process called "rehashing," in which each table location is scanned in turn and its contents, if any, are relocated as necessary. Because this process is time-consuming, it is not performed after every delete, but is instead scheduled only periodically in conventional practice.

Another method of improving the search efficiency of the table after a delete is described by D. Knuth in *The Art of Computer Programming, Volume III: Sorting and Searching,* 1972, Reading, Mass. There, a method is taught in which each delete comprises first locating the element to be deleted, then marking this first location as "empty", and then scanning subsequent locations in turn for an element whose probe sequence has been disrupted by the first "empty" location. This element, if any, is then moved into the first empty location, and the newly vacated location is then marked as "empty." The process then continues to identify and move any other elements whose probe sequences have been disrupted by the introduction of a new empty location, and these are similarly moved. The process ends when an already existing empty location is found. It can be seen that, if the table becomes relatively full, deletion of an element may require more and more time as a result of the necessity of initially marking many locations as "empty," followed by movement of other elements into those temporarily "empty" locations.

Because a great proportion of data processing involves the need to store and search for data elements, it is desirable to provide techniques that allow for even greater efficiency than is conventionally known, both in uni- and multi-threaded environments.

SUMMARY OF THE INVENTION

The invention comprises a number of means for improving the performance of hash tables. A lockless-lookup hash table for use in a multi-threaded environment comprises storage means comprising a plurality of locations, wherein each location is for storing an element, each location is uniquely identified by an index value, and wherein each element comprises a key and a value. The lockless-lookup hash table also includes means for inserting an input element into a location of the storage means. The inserting means comprises means for generating one of the index values from the key of the input element; means for determining whether the location designated by the generated index value is empty; means for locating an empty location if it was determined that the location designated by the generated index value was not empty, wherein the locating means searches for the empty location in accordance with a predetermined probe sequence that uses the generated index value as a starting point; means for storing the element into the location designated by the generated index value if it was determined that the location designated by the generated index value was empty, and for storing the element into the located empty location if it was determined that the location designated by the generated index value was not empty. Further in accordance with this aspect of the invention, the storing means writes the key of the input element into the storage device after it has written the value of the input element into the storage means. By performing the write operations in this order, it is guaranteed that a concurrent lookup operation will never return a lookup value that had never been written into the storage device by any of the threads in the system. That is, a concurrent lookup operation may return an erroneous value, but that value is guaranteed to be one that had been stored into the storage device by one of the threads in the system, and not an uninitialized value.

In accordance with another aspect of the invention, each element of the lockless-lookup hash table may further comprise a hash value. During lookup operations, the hash value of an input key is generated. Then, instead of comparing the key of each probe location with the input key, an initial comparison between the stored hash value and the generated hash value is performed. If the two match, then the lookup operation continues on by comparing the input key with the stored key. This technique has the advantage of speeding up lookup operations whenever the keys are long or otherwise time-consuming to compare.

In yet another aspect of the invention, designating a location as "empty" may be performed by setting the stored hash value to a predefined value. This feature saves having to utilize extra storage bits in the table to hold this indicator. In one embodiment of the invention, the predefined value is an illegal value that is not equal to any of the index values.

In still another aspect of the invention, designating a location as "deleted" may be performed by setting the stored hash value to another predefined value. This strategy also saves having to utilize extra storage bits in the table to hold this indicator. In one embodiment of the invention, the predefined value is an illegal value that is not equal to any of the index values.

In yet another aspect of the invention, the inefficiency associated with the prior art's strategy of first copying an element from a later location to an earlier one and then marking the later location as "empty" is replaced by the following optimized delete function: First, a previously stored element to be deleted is located, and a "deleted" indication is set at that location. Then, the table is reconstructed by copying a first subsequent table element into the delete location and then further reconstructing the table beginning at the first subsequent location, wherein further reconstructing the table changes the first subsequent location by copying a second subsequent table element from a second subsequent location into the first subsequent location without ever setting a "deleted" indication at the first subsequent location, and without ever setting an "empty" indication at the first subsequent location. This strategy provides speed improvements over prior art techniques in that it eliminates intermediate steps associated with designating locations as "empty" or "deleted."

For example, the location from which the element is to be deleted (call it Loc1) is first marked as "deleted", and subsequent locations are scanned in turn for an element whose probe sequence would be disrupted if Loc1 were to be marked as "empty." This element, if any, is then moved from its location (call it Loc2) into Loc1. However, instead of marking Loc2 as "deleted", the present contents of Loc2 are permitted to remain there while the process continues to identify and move any other elements whose probe sequences would be disrupted if Loc2 were to be marked as "empty." If one is found, say at Loc3, then it is simply copied into Loc2, and the process again continues by identifying and moving any other elements whose probe sequences would be disrupted if Loc3 were to be marked as "empty." At some point, an already existing empty location will be encountered in the probe sequence, indicating that no additional elements need to be moved. At this point, the "empty" indicator can safely be set at the last location where it was proposed. It can be seen that this aspect of the invention improves performance because, for each of the elements that were simply moved without subsequently being marked as "empty" or "deleted", a programming step has been saved, thus speeding up the entire process.

In still another aspect of the invention, erroneous results in lockless-lookup multi-threaded environments are reduced by providing a table reconstruction mechanism (for use during delete operations) that performs element copy operations by copying the key of an element to be copied after first copying the value of the element to be copied. In this way, a lookup operation, taking place concurrently with a delete operation, is less likely to match its input key value with that of a table element whose value has not yet been moved as part of the table reconstruction process.

BRIEF DESCRIPTION OF THE DRAWINGS

The present invention will be understood by reading the following detailed description in conjunction with the drawings in which like parts are identified with the same reference characters.

FIG. 1 is a diagram of hash table transformations that occur during a delete operation in accordance with one aspect of the invention;

FIGS. 2a–2d are diagrams of exemplary hash table contents to show one aspect of lockless-lookup capability in accordance with one aspect of the invention;

DETAILED DESCRIPTION

Figures 2A, 2B:
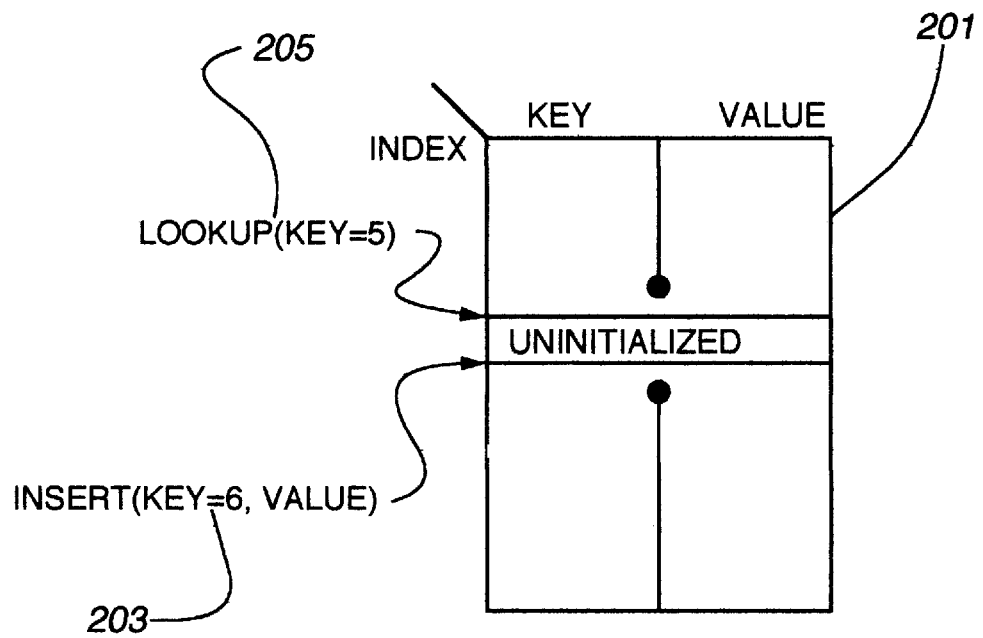

A necessary step when either locating or deleting an element from a hash table is the need to compare the key of the element to be located/deleted with the key of an element already stored in the table. In practice, keys may take on any of a number of different forms, such as integer values and character strings. In some cases, comparing one key to another may be a relatively simple, and therefore short operation. However, it is sometimes the case that comparing keys is a lengthy operation. In accordance with one aspect of the present invention, this inefficiency is reduced by storing, as part of each element, the hash value of the key. Generally, the hash values will be integers which can be quickly compared with one another. Then, further in accordance with this aspect of the invention, the lookup and delete operations initially compare the stored hash value with the hash value of the key to be located/deleted. This can generally be expected to be a short operation. If the two hash values are not equal, then the locate/delete operation can continue on to examine the next stored element, without having to perform a time-consuming comparison of keys. Only when the two hash values are equal is it necessary for the locate/delete operations to compare the two keys. Those skilled in the art will recognize that this last step is necessary because there is nothing to prevent two different keys from mapping onto the same hash value.

So far, the discussion here has mentioned that each location within a closed hash table will either contain a valid element, or else it will be empty. Thus, a way must be provided for marking each table location to indicate its present status. It is further recognized in the art that deleting an element from a closed hash table poses special problems. One cannot simply locate the element to be deleted and then mark it "empty" because this will disrupt the probe sequence for elements that collided with the one to be deleted. Therefore, it is further necessary, in some deletion algorithms, to have the additional capability of marking an element as "deleted." A location that has been marked as "deleted" acts like an empty location with respect to insertions, but like a full location with respect to searches.

In accordance with another aspect of the invention, the need for storing a separate valid/empty/deleted indicator at each location is eliminated by utilizing two "impossible" (i.e., illegal) hash values to respectively represent "empty" and "deleted." Since the hash value will be stored at each table location anyway, no additional memory space is taken up to perform this additional function. For example, if hash values can only take on positive values from 0 through n–1, where n is the table size, then one might utilize hash_value=−1 to represent the fact that a location is empty, and hash_value=−2 to represent the fact that a location had an element deleted. A valid entry would be recognized by the presence of a hash value having a positive value.

In accordance with yet another aspect of the invention, the method for deleting a stored element from a hash table, as taught by Knuth and described in the BACKGROUND section of this specification, can be improved upon in several respects. For one thing, Knuth's deletion strategy relies on the premise that only one thread at a time has access to the table. However, if the hash table is intended for use in a multi-threaded environment that allows lookups to occur concurrently with a deletion, then the concurrent lookup may erroneously return "not found" as a result of the temporarily placed "empty" indication.

Moreover, the delete operation as taught by Knuth has an inherent inefficiency in that it requires two write operations every time the table is changed during the reconstruction process: first an element is moved from a later location into an earlier "empty" location, and then an "empty" indication must be stored into the later location.

To reduce the occurrence of erroneous "element not found" reports that can occur in conventional practice when lookup operations are permitted to proceed concurrently with a delete operation, the delete operation in accordance with the invention first locates the element to be deleted (call it Loc1), and then marks it as "deleted", rather than "empty." As a result, the probe sequence of any concurrently active lookup operation will not be interrupted. Of course, this does not guarantee that a concurrent lookup cannot return an erroneous report of "element not found," but the likelihood of this occurrence is significantly lessened, thereby improving overall performance in a multi-threaded environment.

Next, subsequent locations are scanned in turn for an element whose probe sequence would be disrupted if Loc1 were to be marked as "empty." This element, if any, is then moved from its location (call it Loc2) into Loc1. However, instead of marking Loc2 as "deleted", the present contents of Loc2 are permitted to remain there while the process continues to identify and move any other elements whose probe sequences would be disrupted if Loc2 were to be marked as "empty." If one is found, say at Loc3, then it is simply copied into Loc2, and the process again continues by identifying and moving any other elements whose probe sequences would be disrupted if Loc3 were to be marked as "empty." At some point, an already existing empty location will be encountered in the probe sequence, indicating that no additional elements need to be moved. At this point, the "empty" indicator can safely be set at the last location where it was proposed. It can be seen that this aspect of the invention improves performance because, for each of the elements that were simply moved without subsequently being marked as "empty" or "deleted", a programming step has been saved, thus speeding up the entire process.

An example of the delete operation is illustrated in FIG. 1, wherein only the key of each element is shown, for simplicity of illustration. It will be recognized that each element could also have a value associated with it. The initial state of the table is shown at time=T1. In FIG. 1, six entries are indicated, having keys equal to A, B, C, D, E and F, respectively. In this example, the hash values, h( ), for each of the keys are as follows: h(A)=5, h(B)=6, h(C)=7, h(D)=6, h(E)=5, h(F)=9. It can also be seen from the figure that location 11 is already empty.

Suppose it is desired to remove the element for which key=B. In that case, the element is first found at location 6, and marked "deleted" (time=T2). Next, the probe sequence continues until it is found that the entry for key=D, currently stored at location 8 but having a hash value of "6", would never be found if location 6 were marked as empty. Therefore, the element at location 8 is copied into location 6, as depicted at time=T3. Continuing with the example, it is determined whether location 8 can be marked as empty, or whether this would disrupt the probe sequence of another entry. Upon scanning further entries, it is found that marking location 8 as "empty" would make it impossible to ever locate the element at location 9, whose key=E has a hash value of h(E)=5. Consequently, the element at location 9 is copied into location 8 (time=T4). Continuing still further, it is found that, were we to mark location 9 as "empty", the element at location 10 would never be found, because its key=F has a hash value of h(F)=9. Therefore, the present embodiment calls for copying the element at location 10 into location 9 (time=T5). Finally, a further probe reveals that location 11 is already marked as empty. Consequently, location 10 can be marked as empty without fear of destroying future probe sequences. This final step is depicted at time=T6. It can be seen that by never having marked locations 8 and 9 as either "empty" or "deleted" during this process, at least two instructions have been saved in comparison to prior art approaches.

In one embodiment, the performance of a closed hash table is further improved by making the size of the hash table an exact power of two and by selecting a hash function of the form:

h(key)=key AND bit_mask, where "AND" represents the "bit-wise logical and" operation, and bit_mask is a binary value consisting of m 0's concatenated with n contiguous 1's, where the size of the hash table is $2^n$, and m+n is the number of bits required to represent the key. For example, if the size of the hash table is 16 (=$2^4$), and the key is 16-bits long, then a hash function may be selected to be:

h(key)=key AND b0000000000001111

The placement of the 1's as the least significant bits in the bit_mask is not a requirement.

The above-described procedures yield improvements that are particularly advantageous in multi-threaded environments, where a hash table is available for concurrent access by several independently operating processes or threads.

In some multi-threaded environments, an incorrect result can be returned from a lookup operation when it takes place in parallel with an insert or delete operation. One way of guaranteeing correct results in a multi-threaded environment is to acquire a lock that prevents insertions and deletions from taking place concurrently with the lookup operation. However, the user of the hash table may not require that the hash table always give perfect results. Instead, the return of stale or otherwise inaccurate values, or even of lookup return codes that inaccurately report "element not found" may be acceptable, so long as the hash table guarantees that no lookup operation will ever return a value that had never been inserted into the table by one of the threads in the system. This criterion may be important, for example, where the stored values in the hash table are themselves pointers to other memory locations where the desired data structure may actually be found. Were the hash table capable of returning a randomly generated value, the use of this value as a memory pointer could result in a failure of the computer system. By guaranteeing that, in the worst case, a returned value merely points to an actual, albeit wrong, memory location, the above-described system failure can be avoided. Values obtained from such a hash table could be regarded as "hints" that the user thread may be able to productively utilize. Examples of the use of such a hash table are set forth in the following. The advantage of this approach is the elimination of locks that can detrimentally affect the scalability of the multi-threaded system.

The hash table which will now be described is particularly well-suited for use in a multi-threaded environment because, by being permitted to provide "hints" rather than always-correct answers, it is capable of allowing lockless lookup operations to occur concurrently with either one insert or one delete operation. That is, while it is still a requirement that only one insert or delete operation be permitted to take place at a time, other threads may be permitted to perform an unlimited number of lookups concurrently with the one allowed insert or delete. This greatly reduces the amount of waiting that threads will have to experience. The fact that the lockless lookup hash table can be relied on only to provide "hints" rather than uniformly correct results, where it is guaranteed that the "hint" will never be a value that was not at some point written into the hash table, can be accommodated by any of a number of ways, including doing nothing. One technique for utilizing such a lockless lookup hash table is described in Wong et al.'s U.S. Pat. No. 5,701,432, entitled "A Multi-threaded processing system Having A cache That Is Commonly Accessible to Each Thread," assigned to the same assignee as that of this invention and incorporated herein by reference.

Thus, this aspect provides the above-described lockless lookup hash table that is suitable for use in any multi-threaded environment by complying with both of the following requirements:

1) The user of the lockless lookup hash table, or in some embodiments the table mechanism itself, must provide a locking mechanism to ensure that at most, only one insert or one delete operation takes place at a time. It is impermissible to have insert and delete operating concurrently, and it is also impermissible to have multiple concurrent inserts or multiple concurrent deletes. Thus, a lock must be imposed prior to the start of either an insert or delete operation. The lock should be released upon completion of the insert or delete operation in order to allow other threads to have a chance at inserting into, or deleting from, the table.

2) It is assumed that, in general, the insertion of an element into a table location or the movement of an element from one location to another cannot be performed as an atomic operation. For example, if the processor upon which the hash table is implemented will allow, at most, 32-bit operands to be uninterruptably moved, then a 64-bit element will require that two instructions be executed to complete the move. Since a concurrently operating thread might perform a lookup to a location that is being modified, it is possible that it will read an item after the first 32-bits have been stored, but before the second 32-bits, thereby returning an erroneous result. In order to provide the guarantee that no erroneous result will ever be a value that had not, at some time, been written into the table, the hash table operations must comply with the following strategy: Whenever an element is to be inserted into the table, the value portion of the element must never be the last part of the element stored. Rather, that portion of the element that will cause a lookup operation to determine that it has identified the sought-after location (e.g., the key, or the hash value) must be written last. To clarify this point, consider the hash table 201 depicted in FIG. 2a. It is assumed in this example that an insert operation 203 and a lookup operation 205 are operating concurrently, and that both have key=5 as an input argument. If the location x to which key=5 hashes is initially uninitialized, then the lookup operation 205 would return an uninitialized value if the timing were such that insert had previously completed writing the key portion of the element into location x, but had not yet written the value portion. Thus, to prevent this occurrence, the implementation of the insert operation 203 must write the value first and the key last. By doing so, a concurrent lookup operation 205 will, at worst, return "element not found" because it has not been able to find a key that matches its own key parameter. Since this error does not violate the guarantee that the only value returned will be one that, at some point, had been written into the table, this is a permissible error.

In another aspect of the invention, rule #2 above is extended to delete operations so that whenever an element is to be moved from one location to another, the value portion of the element must never be the last part of the element moved; rather, that portion of the element that will cause a lookup operation to determine that it has identified the sought-after location must be written last. The benefit achieved by incorporating this strategy into the delete operations is to increase the probability that a concurrent locate operation will find the correct value of an element that it is searching for. This point will be made clearer by considering a second example, illustrated in FIG. 2b. Here, the state of the table of FIG. 1 at time=T2 is again depicted, this time showing associated values for each element. It will be recalled that, at this point in the delete operation, the element at index 6 is being deleted, and that the element at location 8 must be copied into location 6 in order to avoid destroying its probe sequence for future searches (the hash value of key=D is h(D)=6). If one were to perform this copy operation by first writing the key portion of the element, the table would look as depicted in FIG. 2c. It is apparent that a concurrent lookup operation with key=D that begins its probe sequence at this instant will find a match at location 6 and erroneously report a value of 2. By contrast, if the strategy of the present invention is applied, then a hash table is produced having an intermediate state as depicted in FIG. 2d. Here it can be seen that a concurrent lookup operation with key=D will find the "deleted" indicator at location 6, and consequently will continue its probe search where it will either locate the desired element at location 8 and return a correct value of 4, or else produce a return code of "element not found" in the event that the timing of the two concurrently operating threads results in the element at location 8 first being deleted. However, either result may be preferable to returning the wrong value, as previously shown in FIG. 2c, if for example the hash table is being used by a cache with a high hit ratio. Under such circumstances, it would be reasonable for the cache to perform some extra checking on a hash table miss. However, it is desired not to perform this extra work on every lookup, so the strategy described above reduces the number of lookups that return values for a different key. Of course, other applications of the hash table might have different requirements, making it desirable to favor erroneous values over erroneous "not found" indications. In such cases, the techniques described above would be modified accordingly.

A number of strategies have been described for improving the performance of hash tables and/or for making a closed hash table suitable for use as a lockless lookup table having the guarantee that no lookup operation will ever return a value that had never been inserted into the table by one of the threads in the system. Those having ordinary skill in the art will recognize that these strategies can be employed together, or alternatively be employed selectively, depending on the requirements of the system being designed. The remainder of this disclosure will describe a preferred embodiment in which all of the above techniques have been employed.

Figure 3:
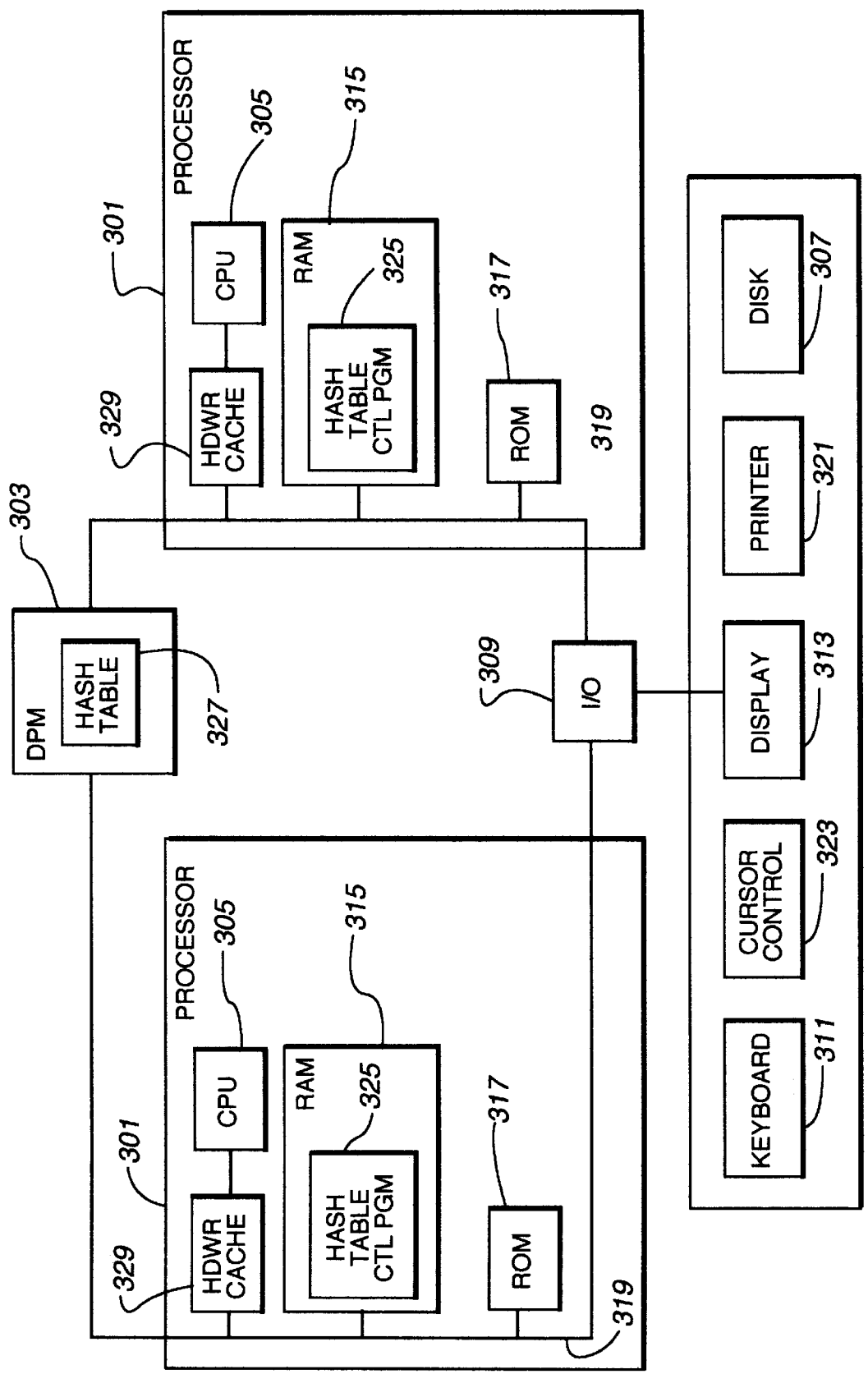
FIG. 3 is a block diagram of an exemplary multi-threaded system for use with the invention.

In a preferred embodiment, the hash table is implemented on a Sun workstation and/or server having multiple "SPARC™" processing units. (Sun and SPARC are trademarks or registered trademarks of Sun Microsystems, Inc., in the United States and other countries.) Referring now to FIG. 3, an exemplary computer system for utilizing the inventive techniques is shown. The system includes two identical processors 301, each coupled to a common dual-port memory (DPM) 303 via a hardware cache 329. Each processor 301 includes a central processing unit (CPU) 305, a random access memory (RAM) 315, a read-only memory (ROM) 317, and a common system bus 319 connecting each of the above elements. Each processor 301 is also connected, via the bus 319, to a shared input/output (I/O) controller 309. The I/O controller 309 allows the processors to be coupled to the input devices 307, 311 and 323, and to the output devices 313 and 321. Each of these components is well-known in the art, and need not be described here in further detail.

Each processor 301 includes a number of pieces of software which can be executed by the CPU 305. One of those pieces of software is an operating system, which may alternatively execute out of the ROM 317 or the RAM 315. SOLARIST™ is the preferred operating system. (Sun and Solaris are trademarks or registered trademarks of Sun Microsystems, Inc., in the United States and other countries.) Operating systems are well-known in the art, and the description of the operating system is beyond the scope of this specification. In an alternative embodiment, the system may have only a single processor 301 and an operating system that has multitasking capability, so that threads may operate concurrently. In this alternative embodiment, it is the multiple threads that are allowed common and concurrent access to a hash table stored in a memory.

Returning to the embodiment depicted in FIG. 3, each of the processors 301 operates independently from one another by executing programs stored in either the RAM 315 or ROM 317. In this example, each processor 301 includes a hash table control program 325 which governs that processor's access to a hash table 327 which is stored in the DPM 303.

The format of the hash table 327 will now be described in greater detail with reference to FIG. 4. The hash table 327 has N locations, having addresses within the range 0 through N−1. The number of locations in the hash table 327 should be at least one more than the maximum number of elements to be stored in the table, in order to ensure that there is always at least one empty element in the table. In a preferred embodiment, the number of locations in the hash table 327 is rounded up to the closest power of two, so that a bit-wise AND can be used as a hash function. Each location has a number of fields for storing, respectively, a key 401, a hash of key 403, and a value 405.

Referring back now to FIG. 3, the operation of the exemplary hash table control program 325 will now be described in greater detail by the following pseudocode, and also with reference to FIGS. 5–9. According to the pseudocode, English text is formatted into a program-like structure to indicate the nature and order of data movement and transformation. It should be understood that although the following discussion refers to various values, this is done merely as a convenience, and that the following process actually describes one embodiment of means for generating control signals that control the operation of the exemplary computer system. Those having ordinary skill in the art will recognize that the following examples merely illustrate one embodiment of the invention, and that modifications to the exemplary embodiment can be made which would still fulfill all of the requirements described in this disclosure.

Figure 4:
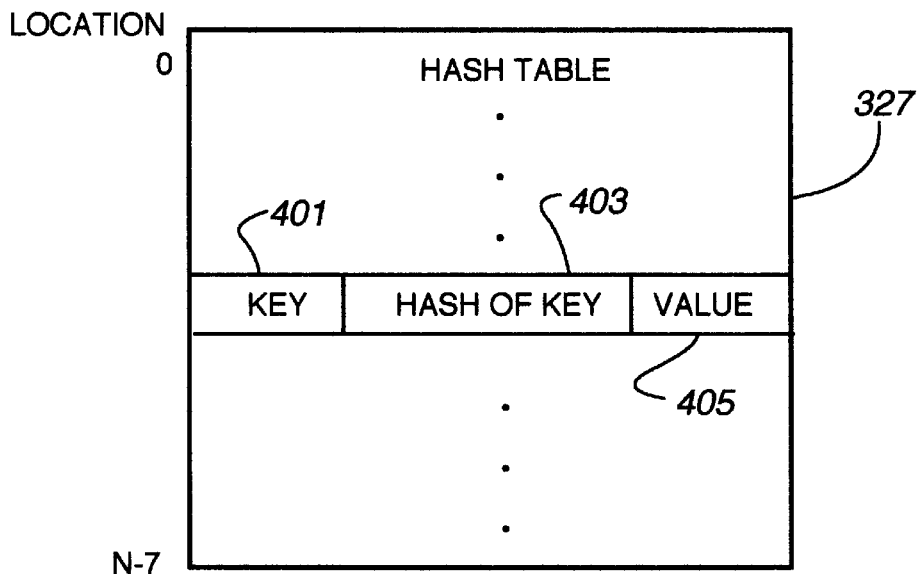
FIG. 4 is a block diagram of an exemplary hash table element in accordance with one aspect of the invention.

In FIG. 4, the key 401, hash of key 403, and value 405 are defined by the following statements:

```
type Element is aggregate of {
    Integer key, hash_of_key, value;
}
```

Figure 5:
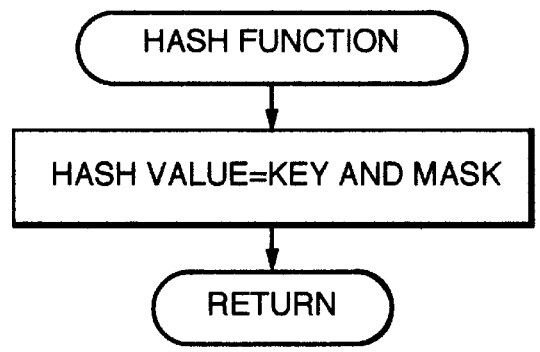
FIG. 5 is a flow chart of an exemplary hash function in accordance with one aspect of the invention.

In the exemplary embodiment, the hash of key 403 is set to one of two values that will never be produced by the hash function whenever it is desired to mark a location as alternatively "empty" or "deleted". Also, the table will be defined as an array of elements. These are represented by the following pseudocode:

constant Reserved_empty=−1;
constant Reserved_deleted=−2;
type Table is array of Element;

The hash function is a bit-wise logical AND of the input key and a bit-mask as shown in the following pseudocode, and also in the flowchart of FIG. 5:

```
Integer
hash_function(Integer input)
{
    -- Use bit-wise logical AND to obtain value
    -- in range [0..table_size−1]
    return input AND (table_size − 1);
}
```

Figure 6:
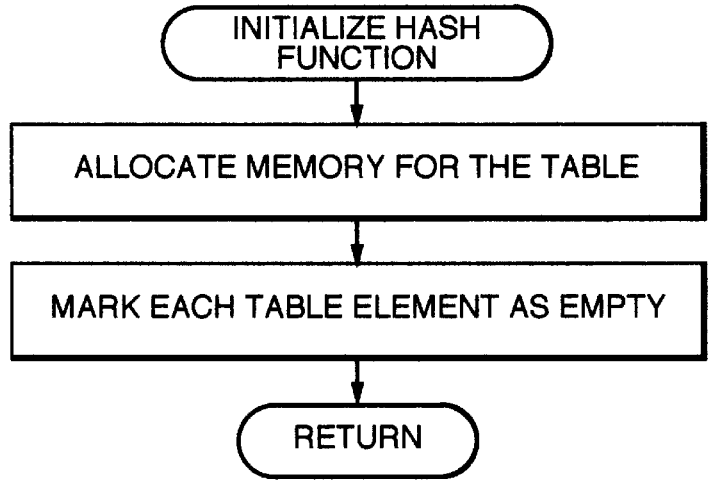
FIG. 6 is a flow chart of a hash table initialization routine in accordance with one embodiment of the invention.

The following pseudocode, also depicted in the flowchart of FIG. 6, initializes the hash table for use:

```
-- Prepare a hash table for use
Table
initialize_table (Integer number_of_elements)
{
    Integer table_size = next-higher-power-of-two(number_of_elements);
    Table the_table = allocate-memory(number_of_elements * size of
        (Element));
    for each Element e in table do {
        -- Mark the table element as empty
        e.hash_of_key = Reserved_empty;
    }
}
```

Figure 7:
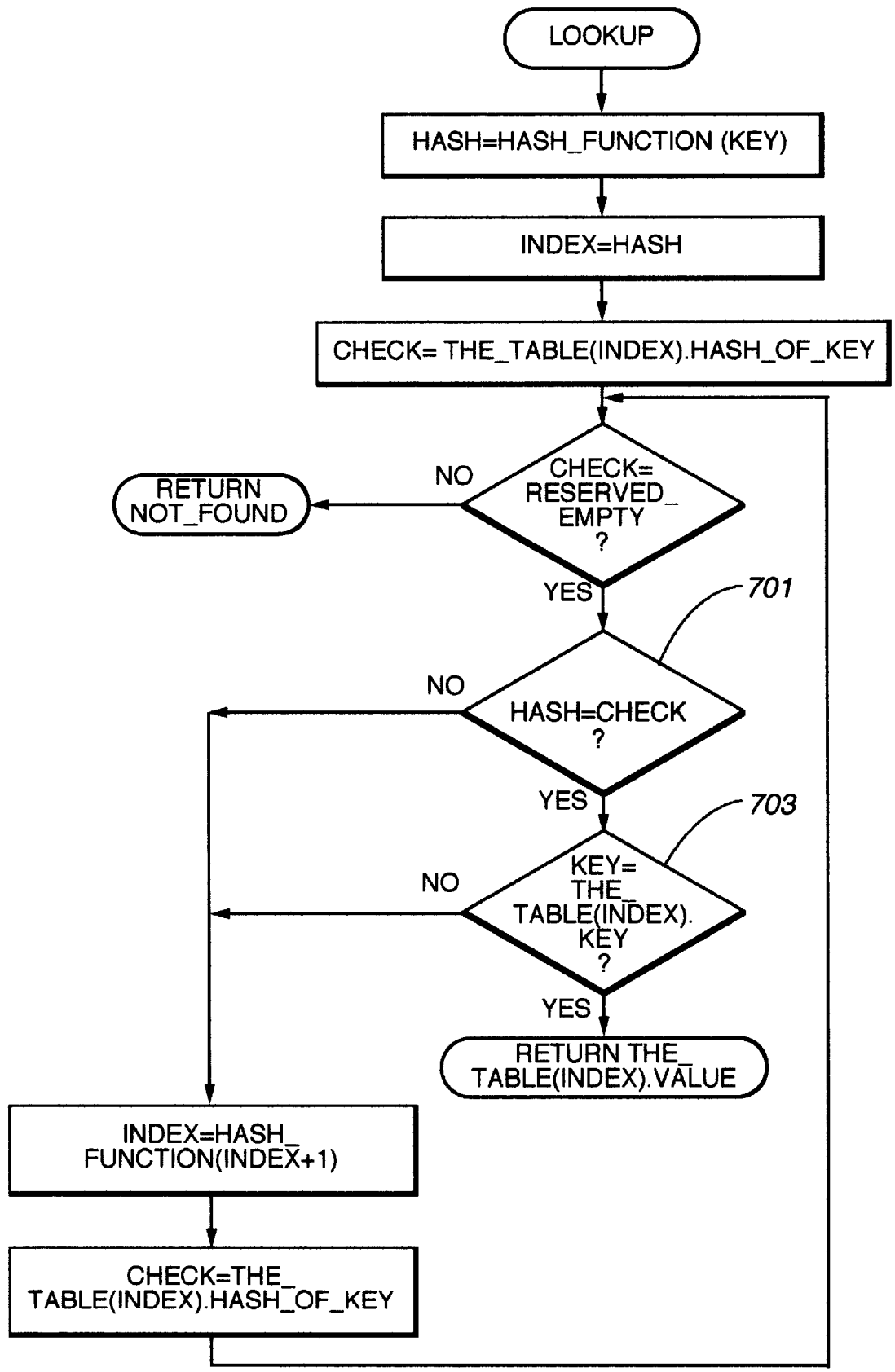
FIG. 7 is a flow chart of a hash table lookup operation in accordance with one aspect of the invention.

The lookup operation, which returns a value associated with the input key, is defined by the following pseudocode, and is also illustrated in the flowchart of FIG. 7:

```
Integer
lookup_in_table(Table the_table, Integer key)
{
    Integer hash = hash_function(key);
    Integer index = hash;
    Integer check = the_table[index].hash_of_key;
    -- Loop until an empty slot is found
    while (check != Reserved_empty) {
        -- If the hash values don't match,
        -- don't bother comparing keys
        if (hash == check) {
            if (key == the_table[index].key) {
                return the_table[index].value;
            }
        }
        -- Check next element (use hash function
        -- to handle the wrap-around automatically)
        index = hash_function(index + 1);
        check = the_table[index].hash_of_key;
    }
```

-continued

```
    return Not_found;
}
```

It can be seen from the above lookup routine that the stored hash of key value is utilized in step 701 (see FIG. 7) to eliminate a possibly much more costly comparison of keys. Only if the computed hash value of the input key matches the stored hash of key value does the routine perform a comparison of keys (step 703). As stated earlier, the comparison of keys is necessary in this instance because it is possible that different keys could generate the same hash value. Therefore, the check at step 701 cannot be relied upon as the final determination that the desired element has been found.

Figure 8:
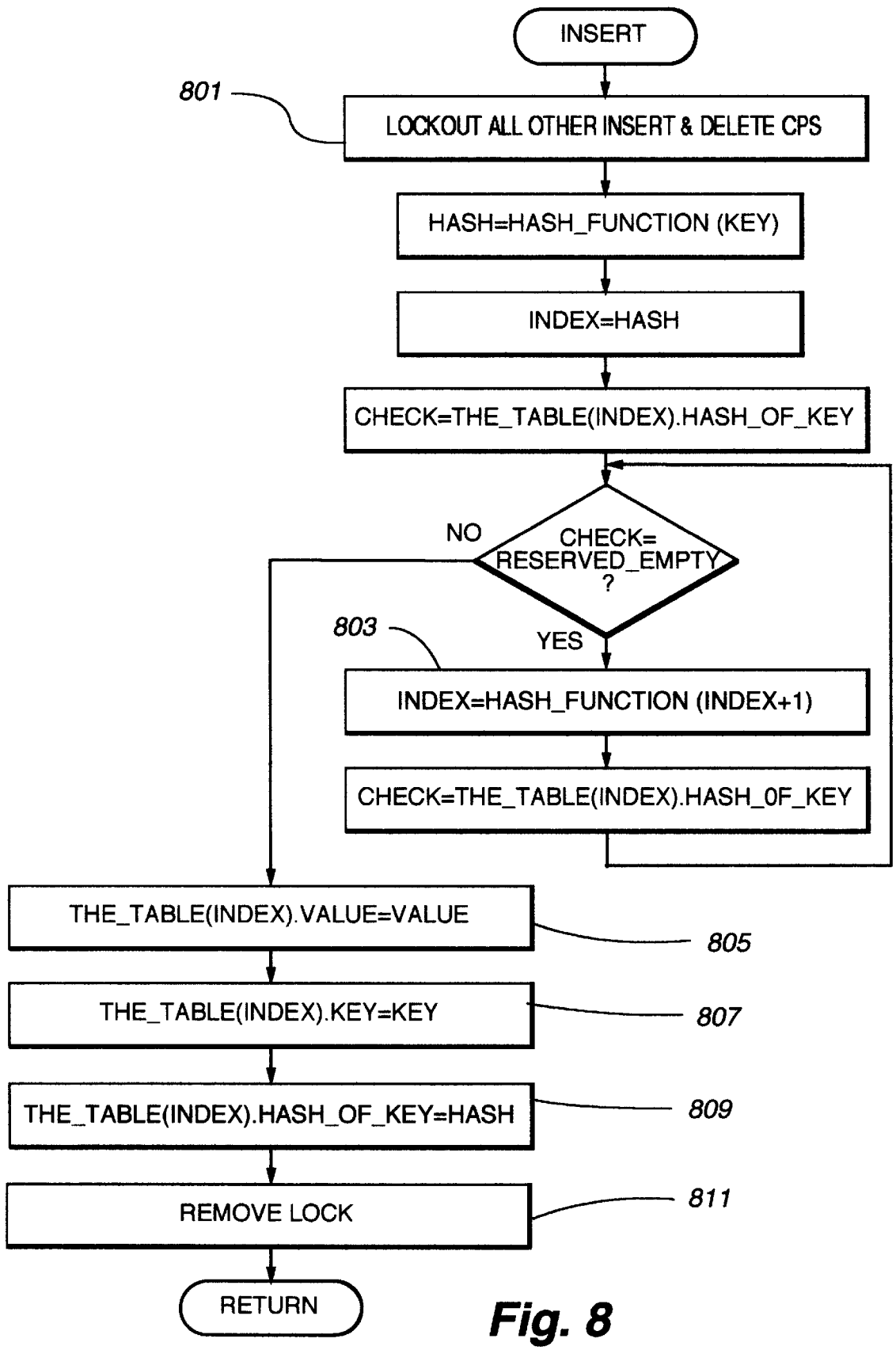
FIG. 8 is a flow chart of a hash table insert operation in accordance with one aspect of the invention.

The insert operation, which inserts a value into a location determined by the input key and the state of the table at the time of the insert is defined by the following pseudocode, and is also illustrated in the flowchart of FIG. 8:

```
insert_into_table(Table the_table, Integer key, Integer value)
{
    lock out all other insert and delete operations;
    Integer hash = hash_function (key);
    Integer index = hash;
    Integer check = the_table[index].hash_of_key;
    while (check != Reserved_empty) {
        index = hash_function (index + 1)
        check = the_table[index].hash_of_key;
    }
    the_table[index].value = value;
    the_table[index].key = key;
    the_table[index].hash_of_key = hash;
    remove lock;
}
```

The following remarks are offered in connection with the above-described insert operation. First, the locking and unlocking steps 801 and 811 are necessary for the proper operation of the hash table. However, in alternative embodiments, these may be omitted, and the burden placed on the user of the hash routines to ensure that proper locking is invoked. Often, the user may desire to lock an operation associated with an entity that utilizes the inventive hash table, so that the provision of locks within the insert operation would be redundant.

Also in connection with the insert operation, it is noted that in the event of a collision during the probe sequence, step 803 generates a new index by supplying the value index+1 to the hash function. However, because of the way the hash function has been defined, this reduces to merely incrementing the index by 1, modulo table_size.

Finally, it is worth pointing out that the sequence of steps 805, 807 and 809 has been designed in accordance with the teachings presented above, so that the value is not the last element field stored. Rather, the hash value, which will determine whether a concurrent lookup finds a match, is the last item to be written. This guarantees that any lookup operation acting concurrently with the insert operation will never return a value that had never been written into the table by one of the threads in the system.

Figure 9A:
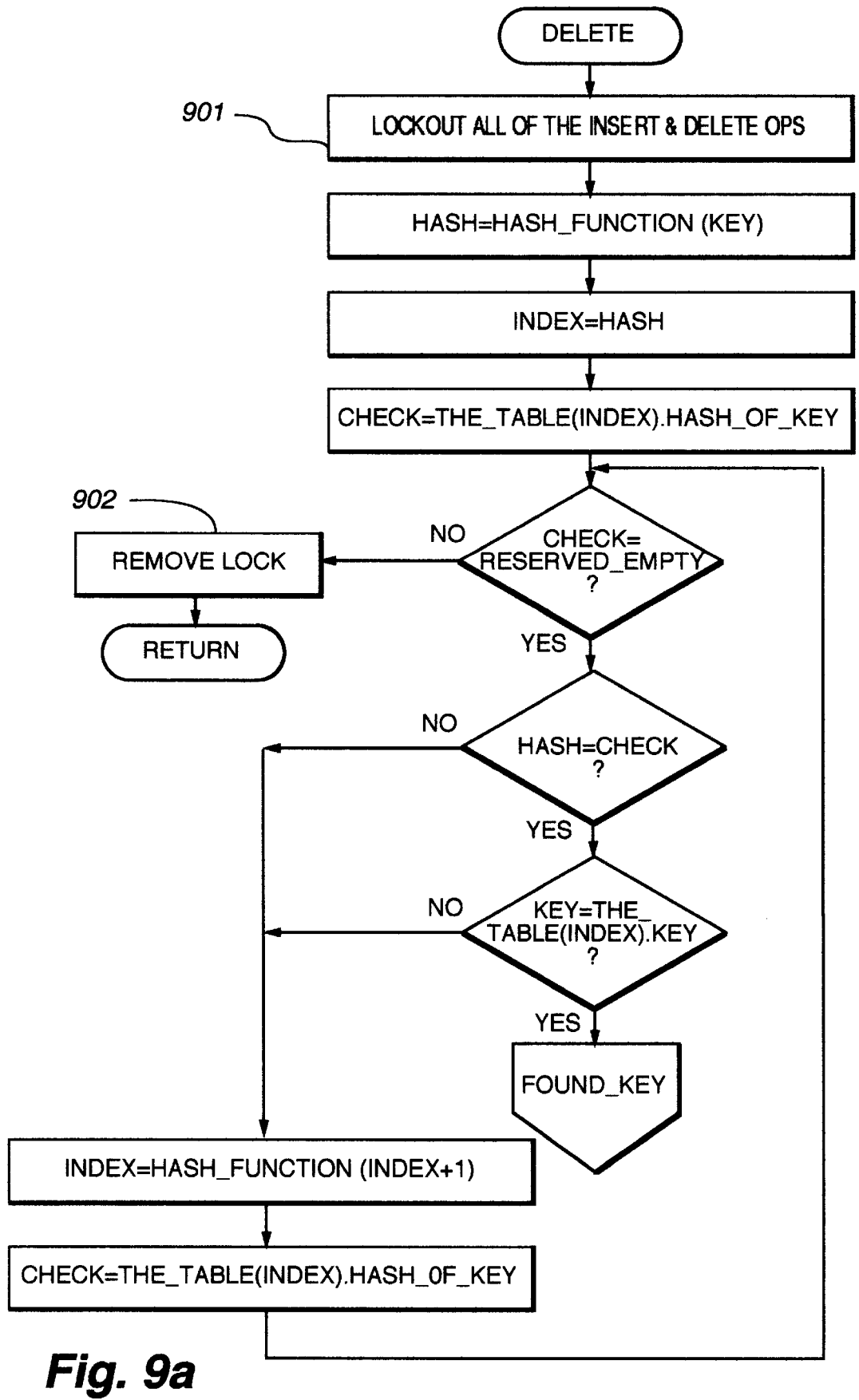
FIGS. 9a and 9b together depict a flow chart of a hash table delete operation in accordance with one aspect of the invention.
Figure 9B:
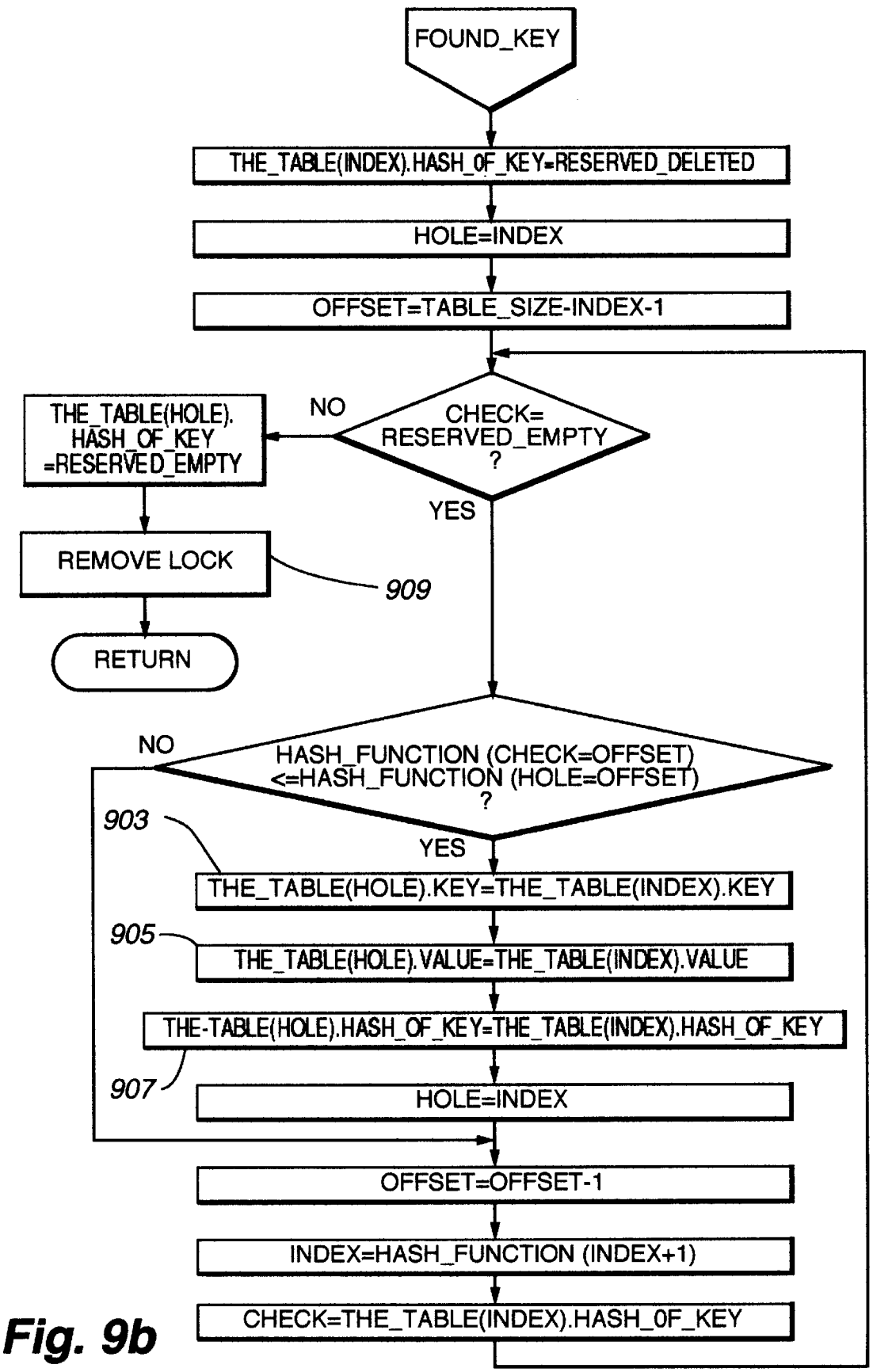

The delete operation, which locates an element that matches an input key, deletes that entry from the table and then reorders the table to provide maximum efficiency during future lookup operations is defined by the following pseudocode, and is also illustrated in the flowchart depicted in FIGS. 9*a*–9*b*:

```
delete_from_table(Table the_table, Integer key)
{
    Lock out all other insert and delete operations
    Integer hash = hash_function(key);
    Integer index = hash;
    Integer check = the_table [index].hash_of_key;
    while (check != Reserved_empty) {
        if (hash == check) {
            if (key == the_table[index].key) {
                goto found_key;
            }
        }
        index = hash_function(index + 1);
        check = the_table[index].hash_of_key;
    }
    -- Item not present in table, return immediately.
    remove lock;
    return;
    found_key:
    -- Mark the element as deleted right away
    the_table[index].hash_of_key = Reserved_deleted;
    -- Hole is the position we are trying to fill
    -- with a valid element.
    Integer hole = index;
    -- Offset is used to eliminate ordering problem
    -- when comparing hash values.
    Integer offset = table_size - index - 1;
    -- Try to find an element to fill the hole.
    while (check != Reserved empty) {
        -- If current element hashes above hole,
        -- use it to fill hole.
        if (hash function(check + offset) <=
                hash_function(hole + offset)) {
            the_table[hole].key = the_table [index].key;
            the_table[hole].value = the_table [index].value;
            the_table[hole].hash_of_key =
                    the_table[index].hash_of_key;
            -- Now we have a new hole to fill.
            hole = index
        }
        offset = offset - 1;
        index = hash_function(index + 1),
        check = the_table[index].hash_of_key;
    }
    -- Now we can finally mark the table element as empty
    the_table[hole].hash_of_key = Reserved empty;
    Remove lock;
}
```

With respect to the above-described delete operation, the following points may be made. First, like the insert operation, the provision of locks (steps 901, 902 and 909) to prevent any concurrent insert or delete operations is necessary, but may be omitted in alternative embodiments where the user may be relied upon to provide an equivalent locking mechanism.

Also, the sequence of steps 903, 905 and 907 has been designed, as described above, to increase the probability that a concurrent lookup will locate an item that is in the process of being moved. This is accomplished by making sure that all parameters necessary to locate this element (i.e., the key in conjunction with the stored hash value) are not both moved prior to moving the value of the element.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a processing system having a hash table that is accessible to only one thread, the hash table having a plurality of locations each being identified by an index value and each adapted for storage of a stored entry therein, each stored entry comprising a stored key, a stored value, a stored hash value derived from a first operation on the stored key, and an indication that the location at which the stored entry is stored contains a valid stored entry, a previously deleted stored entry, or is currently empty, a method of performing a lookup operation of a stored entry having a matching lookup key, the method comprising:

a) generating an index value from the lookup key using the first operation;
   b) selecting from the hash table one of the stored entries as a check entry, the check entry forming one of a sequence of one or more check entries;
   c) determining if the check entry is empty and returning a lookup failure result if the check entry is empty;
   d) if the check entry is not empty, comparing the lookup key with the stored key of the check entry only if the generated index value matches the stored hash value of the check entry;
   e) returning a lookup successful result with the check entry as a matching entry if the stored key and the lookup key are identical; and
   f) if the stored key and the lookup key are not identical, selecting from the hash table another stored entry as the check entry and repeating steps c)–f).

2. The method of claim 1, wherein the step of selecting a stored entry as the check entry comprises:

i) if the selected check entry is the first entry of the sequence, selecting as the check entry the stored entry identified by the generated index value;
   ii) if the selected check entry is not the first entry of the sequence, selecting as the check entry the stored entry identified by the smallest index value of the hash table if the previous check entry in the sequence has the highest index value of the hash table; and
   iii) if the selected check entry is not the first entry of the sequence and if the previous check entry in the sequence does not have the highest index value of the hash table, selecting as the check entry the stored entry having the smallest index value of the hash table that is greater than the index value of the previous check entry; and
   iv) repeating steps i)–iv) if the selected check entry is a previously deleted stored entry.

3. The method of claim 1, wherein the indication that a location contains a valid stored entry is provided by the stored hash value of the stored entry at a location having an index value that identifies one of the entries in the hash table.

4. The method of claim 1, wherein the indication that a location is empty is provided by the stored hash value of the stored entry at a location having a unique predetermined index value that does not identify any entries in the hash table.

5. The method of claim 1, wherein the indication that a location contains a previously deleted entry is provided by the stored hash value of the stored entry at a location having a unique predetermined index value that does not identify any entries in the hash table.

6. In a multi-threaded processing system having a hash table that is accessible to each thread, the hash table having a plurality of locations each being identified by an index value and each adapted for storage of a stored entry therein, each stored entry comprising a stored key, a stored value, and a stored hash value derived from a first operation on the stored key, and an indication that the location at which the stored entry is stored contains a valid stored entry, a previously deleted stored entry, or is currently empty, a method of performing a lookup operation of a stored entry having a matching lookup key, the method comprising:

a) generating an index value from the lookup key using the first operation;
   b) selecting from the hash table one of the stored entries as a check entry, the check entry forming one of a sequence of one or more check entries;
   c) determining if the check entry is empty and returning a lookup failure result if the check entry is empty;
   d) if the check entry is not empty, comparing the lookup key with the stored key of the check entry only if the generated index value matches the stored hash value of the check entry;
   e) if the stored key and the lookup key are not identical, selecting from the hash table another stored entry as the check entry and repeating steps c)–e);
   f) verifying that the check entry contains a stored key that is identical to the check entry, the step of verifying comprising:
      i) acquiring a mutual exclusion lock that grants exclusive access at least to the check entry;
      ii) returning a lookup successful result with the check entry as the matching entry if the stored key of the check entry and the lookup key are identical;
      iii) returning a lookup failure result if the check entry and the lookup key are not identical.

7. The method of claim 6, wherein the step of selecting a stored entry as the check entry comprises:

i) if the selected check entry is the first entry of the sequence, selecting as the check entry the stored entry identified by the generated index value;
   ii) if the selected check entry is not the first entry of the sequence, selecting as the check entry the stored entry identified by the smallest index value of the hash table if the previous check entry in the sequence has the highest index value of the hash table; and
   iii) if the selected check entry is not the first entry of the sequence and if the previous check entry in the sequence does not have the highest index value of the hash table, selecting as the check entry the stored entry having the smallest index value of the hash table that is greater than the index value of the previous check entry; and
   iv) repeating steps i)–iv) if the selected check entry is a previously deleted stored entry.

8. The method of claim 6, wherein the indication that a location contains a valid stored entry is provided by the stored hash value of the stored entry at a location having an index value that identifies one of the entries in the hash table.

9. The method of claim 6, wherein the indication that a location is empty is provided by the stored hash value of the stored entry at a location having a unique predetermined index value that does not identify any entries in the hash table.

10. The method of claim 6, wherein the indication that a location contains a previously deleted entry is provided by the stored hash value of the stored entry at a location having a unique predetermined index value that does not identify any entries in the hash table.

11. In a processing system having a hash table that is accessible to at least one thread, the hash table having a plurality of locations at least one of which is empty, each location being identified by an index value and each adapted for storage of a stored entry therein, each stored entry comprising a stored key, a stored value, a stored hash value derived from a first operation on the stored key, and an indication that the location contains a valid stored entry or is currently empty, a method of inserting an input entry having an input entry key into an empty location comprising:

a) generating an index value from the input entry key using the first operation;

b) selecting from the hash table one of the stored entries as a check entry, the check entry forming one of a sequence of one or more check entries;

c) determining if the check entry is empty;

d) repeating steps b)–d) if the check entry is not empty;

e) inserting the input entry into the location of the check entry, wherein the step of inserting comprises:

i) replacing the stored value of the check entry with the value of the input entry;

ii) replacing the stored key of the check entry with the key of the input entry; and iii) replacing the stored hash value of the check entry with the generated index value; and f) setting the indication of the location containing the check entry as containing a valid stored entry by replacing the stored hash value of the check entry with a generated index value from the key of the input entry.

12. The method of claim 11, wherein the step of replacing the stored value precedes the step of replacing the stored key, and wherein the step of replacing the stored key precedes the step of replacing the stored hash value.

13. The method of claim 11, wherein the step of selecting a stored entry as the check entry comprises:

i) if the selected check entry is the first entry of the sequence, selecting as the check entry the stored entry identified by the generated index value;

ii) if the selected check entry is not the first entry of the sequence, selecting as the check entry the stored entry identified by the smallest index value of the hash table if the previous check entry in the sequence has the highest index value of the hash table; and iii) if the selected check entry is not the first entry of the sequence and if the previous check entry in the sequence does not have the highest index value of the hash table, selecting as the check entry the stored entry having the smallest index value of the hash table that is greater than the index value of the previous check entry.

14. The method of claim 11, wherein the indication that a location contains a valid stored entry is provided by the stored hash value of the stored entry at a location having an index value that identifies one of the entries in the hash table.

15. The method of claim 11, wherein the indication that a location is empty is provided by the stored hash value of the stored entry at a location having a unique predetermined index value that does not identify any entries in the hash table.

16. In a processing system having a hash table that is accessible to at least one thread, the hash table having a plurality of locations each being identified by an index value and each adapted for storage of a stored entry therein, each stored entry comprising a stored key, a stored value, a stored hash value derived from a first operation on the stored key, and an indication that the location at which the stored entry is stored contains a valid stored entry, a previously deleted stored entry, or is currently empty, a method of deleting from the hash table a stored entry having a key matching a key of an input entry, the method comprising:

a) generating an index value from the key of the input entry using the first operation;

b) locating a stored entry having the matching key;

c) returning a delete failure result if a stored entry having a matching key is not located;

d) deleting the located stored entry by setting the indication of the location that contains the located stored entry as having a previously deleted stored entry;

e) selecting the deleted entry as a check entry;

f) selecting a next check entry from the hash table;

g) copying the contents of the location of the next check entry into the location of the check entry only if the next check entry location is not indicated as empty and the stored hash value of the next check entry is less than or equal to the stored hash value of the check entry, the step of copying comprising:

i) replacing the stored value of the check entry with the stored value of the next check entry;

ii) replacing the stored key of the check entry with the stored key of the next check entry;

iii) replacing the stored hash value of the check entry with the stored hash value of the next check entry; and iv) replacing the indication of the location of the check entry with the indication of the location of the next check entry;

h) if the next check entry is not empty, repeating steps g)–h) using the next check entry as the check entry and another entry from the hash table as the next check entry; and i) setting the indication of the location containing the check entry as empty.

17. The method of claim 16, wherein steps i)–iv) of step g) are performed in sequence starting with step i) and ending with iv).

18. The method of claim 16, wherein the new next check entry is determined as follows:

if the check entry has the highest stored index value of the hash table, the new next check entry is the stored entry identified by the lowest index value of the hash table;

if the check entry does not have the highest index value of the hash table, the new next check entry is the stored entry identified by the lowest index value of the hash table that is greater than the index value of the location of the check entry.

19. The method of claim 16, wherein the indication that a location contains a valid stored entry is provided by the stored hash value of the stored entry at a location having an index value that identifies one of the entries in the hash table.

20. The method of claim 16, wherein the indication that a location is empty is provided by the stored hash value of the stored entry at the location having a unique predetermined index value that does not identify any entries in the hash table.

21. The method of claim 20, wherein the step of setting the indication of the location containing the check entry as empty comprises replacing the stored hash value of the stored entry at the location containing the stored entry with the unique predetermined index value.

22. The method of claim 16, wherein the indication that a location contains a previously deleted entry is provided by the stored hash value of the stored entry at a location having a unique predetermined index value that does not identify any entries in the hash table.

23. The method of claim 22, wherein the step of setting the indication of the location that contains the located stored entry as having a previously deleted stored entry comprises replacing the stored hash value of the located stored entry with the unique predetermined index value.

24. A hash system for use in a single-threaded processing system, the hash system comprising:
   storage means comprising a plurality of locations each being identified by an index value and each adapted for storage of a stored entry therein, each stored entry comprising a stored key, a stored value, a hash value derived from a first operation on the stored key, and an indication that the location at which the stored entry is stored contains a valid stored entry, a previously deleted stored entry, or is currently empty; and
   lookup means for performing a lookup operation of a stored entry having a matching lookup key, the lookup means comprising:
      means for generating an index value from the lookup key using the first operation;
      means for selecting from the storage means one of the stored entries as a check entry, the check entry forming one of a sequence of one or more check entries;
      means for determining if the check entry is empty and for returning a lookup failure result if the check entry is empty;
      means for comparing the lookup key with the stored key of the check entry if the check entry is not empty and only if the generated index value matches the stored hash value of the check entry;
      means for returning a lookup successful result with the check entry as a matching entry if the stored key and the lookup key are identical; and
      means for causing said means for selecting to proceed to a different stored entry as the check entry if the stored key and lookup key are not identical.

25. The hash system of claim 24, wherein the means for selecting selects as the check entry the stored entry identified by the generated index value if the selected check is the first entry of the sequence, selects as the check entry the stored entry identified by the lowest index value of the storage means if the selected check entry is not the first entry of the sequence and if the previous check entry in the sequence has the highest index value of the storage means and selects as the check entry the stored entry having the lowest index value of the storage means that is greater than the index value of the previous check entry if the selected check entry is not the first entry of the sequence and if the previous check entry in the sequence does not have the highest index value of the storage means, and wherein the means for selecting does not select a previously deleted stored entry as the check entry.

26. The hash system of claim 24, wherein the indication that a location contains a valid stored entry is provided by the stored hash value of the stored entry at a location having an index value that identifies one of the entries in the storage means.

27. The hash system of claim 24, wherein the indication that a location is empty is provided by the stored hash value of the stored entry at a location having a unique predetermined index value that does not identify any entries in the storage means.

28. The hash system of claim 24, wherein the indication that a location contains a previously deleted entry is provided by the stored hash value of the stored entry at a location having a unique predetermined index value that does not identify any entries in the storage means.

29. A hash system for use in a processing system having a plurality of threads capable of accessing the hash system, the hash system comprising:
   storage means having a plurality of locations each being identified by an index value and each adapted for storage of a stored entry therein, each stored entry comprising a stored key, a stored value, a stored hash value derived from a first operation on the stored key, and an indication that the location at which the stored entry is stored contains a valid stored entry, a previously deleted stored entry, or is currently empty;
   lookup means for performing a lookup operation of a stored entry having a matching lookup key, the lookup means comprising:
      means for generating an index value from the lookup key using the first operation;
      means for selecting from the storage means one of the stored entries as a check entry, the check entry forming one of a sequence of one or more check entries;
      means for determining if the check entry is empty and for returning a lookup failure result if the check entry is empty;
      means for comparing the lookup key with the stored key of the check entry if the check entry is not empty and only if the generated index value matches the stored hash value of the check entry;
      means for causing the means for selecting to select from the storage means another stored entry as the check entry if the stored key and the lookup key are not identical; and
      means for verifying that the check entry contains a stored key that is identical to the check entry, said means for verifying acquiring a mutual exclusion lock that grants exclusive access at least to the check entry, returning a lookup successful result with the check entry as the matching entry if the stored key of the check entry and the lookup key are identical, and returning a lookup failure result if the check entry and the lookup key are not identical.

30. The hash system of claim 29, wherein the means for selecting selects as the check entry the stored entry identified by the generated index value if the selected check entry is the first entry of the sequence, the stored entry identified by the lowest index value of the storage means if the previous check entry in the sequence has the highest index value of the storage means and if the selected check entry is not the first entry of the sequence, and the stored entry having the lowest index value of the storage means that is greater than the index value of the previous check entry if the selected check entry is not the first entry of the sequence and if the previous check entry in the sequence does not have the highest index value of the storage means, and wherein the means for selecting does not select a previously deleted stored entry as the check entry.

31. The hash system of claim 29, wherein the indication that a location contains a valid stored entry is provided by the stored hash value of the stored entry at a location having an index value that identifies one of the entries in the storage means.

32. The hash system of claim 29, wherein the indication that a location is empty is provided by the stored hash value of the stored entry at a location having a unique predetermined index value that does not identify any entries in the storage means.

33. The hash system of claim 29, wherein the indication that a location contains a previously deleted entry is provided by the stored hash value of the stored entry at a location having a unique predetermined index value that does not identify any entries in the storage means.

34. A hash system for use in a processing system having at least one thread capable of accessing the hash system, the hash system comprising:

storage means having a plurality of locations at least one of which is empty, each location being identified by an index value and each adapted for storage of a stored entry therein, each stored entry comprising a stored key, a stored value, a stored hash value derived from a first operation on the stored key, and an indication that the location contains a valid stored entry or is currently empty; and insertion means for inserting an input entry into an empty location, the insertion means comprising:

means for generating an index value from the key of the input entry using the first operation;

means for selecting from the storage means one of the stored entries as a check entry, the check entry forming one of a sequence of one or more check entries;

means for determining if the check entry is empty and for selecting from the storage means a new check entry if the check entry is not empty;

means for inserting the input entry into the location of the check entry by replacing the stored value of the check entry with the value of the input entry, replacing the stored key of the check entry with the key of the input entry, and replacing the stored hash value of the check entry with the generated index value; and means for setting the indication of the location containing the check entry as containing a valid stored entry by replacing the stored hash value of the check entry with a generated index value from the key of the input entry.

35. The hash system of claim 34, wherein the means for inserting replaces the stored hash value after replacing the stored key, and replaces the stored key after replacing the stored value.

36. The hash system of claim 34, wherein the means of selecting a stored entry selects as the check entry the stored entry identified by the generated index value if the selected check entry is the first entry of the sequence, the stored entry identified by the lowest index value of the storage means if the previous check entry in the sequence has the highest index value of the storage means if the selected check entry is not the first entry of the sequence, and the stored entry having the lowest index value of the storage means that is greater than the index value of the previous check entry if the selected check entry is not the first entry of the sequence and if the previous check entry in the sequence does not have the highest index value of the storage means.

37. The hash system of claim 34, wherein the indication that a location contains a valid stored entry is provided by the stored hash value of the stored entry at a location having an index value that identifies one of the entries in the storage means.

38. The hash system of claim 34, wherein the indication that a location is empty is provided by the stored hash value of the stored entry at a location having a unique predetermined index value that does not identify any entries in the storage means.

39. A hash system for use in a processing system having at least one thread capable of accessing the hash system, the hash system comprising:

storage means having a plurality of locations each being identified by an index value and each adapted for storage of a stored entry therein, each stored entry comprising a stored key, a stored value, a stored hash value derived from a first operation on the stored key, and an indication that the location at which the stored entry is stored contains a valid stored entry, a previously deleted stored entry, or is currently empty; and means for deleting from the storage means a stored entry having a key matching the key of an input entry, the means for deleting comprising:

means for generating an index value from the key of the input entry using the first operation;

means for locating a stored entry having the matching key;

means for returning a delete failure result if a stored entry having a matching key is not located;

means for deleting the located stored entry by setting the indication of the location that contains the located stored entry as having a previously deleted stored entry;

means for selecting the deleted entry as the check entry;

means for selecting a next check entry from the storage means;

means for copying the contents of the location of the next check entry into the location of the check entry only if the next check entry location is not indicated as empty and the stored hash value of the next check entry is less than or equal to the stored hash value of the check entry, said means for copying replacing the stored value of the check entry with the stored value of the next check entry, replacing the stored key of the check entry with the stored key of the next check entry, replacing the stored hash value of the check entry with the stored hash value of the next check entry, and replacing the indication of the location of the check entry with the indication of the location of the next check entry;

means for causing the means for selecting to select the next check entry as a check entry and another entry from the storage means as the next check entry if the next check entry is not empty; and means for setting the indication of the location containing the check entry as empty.

40. The hash system of claim 39, wherein the new next check entry is determined as follows:

if the check entry has the highest index value of the storage means, the new next check entry is the stored entry identified by the lowest index value of the storage means;

if the check entry does not have the highest index value of the storage means, the new next check entry is the stored entry identified by the lowest index value of the storage means that is greater than the index value of the location of the check entry.

41. The hash system of claim 39, wherein the indication that a location contains a valid stored entry is provided by the stored hash value of the stored entry at a location having an index value that identifies one of the entries in the storage means.

42. The hash system of claim 39, wherein the indication that a location is empty is provided by the stored hash value of the stored entry at the location having a unique predetermined index value that does not identify any entries in the storage means.

43. The hash system of claim 42, wherein the means for setting the indication of the location containing the check entry as empty replaces the stored hash value of the stored entry at the location containing the stored entry with the unique predetermined index value.

44. The hash system of claim 39, wherein the indication that a location contains a previously deleted entry is provided by the stored hash value of the stored entry at a location having a unique predetermined index value that does not identify any entries in the storage means.

45. The hash system of claim 44, wherein the means for setting the indication of the location that contains the located stored entry as having a previously deleted stored entry replaces the stored hash value of the located stored entry with the unique predetermined index value.

* * * * *